United States Patent
Hebrard

(10) Patent No.: US 11,131,603 B2
(45) Date of Patent: Sep. 28, 2021

(54) SENSORIZED MECHANICAL COMPONENT

(71) Applicant: SKF Aerospace France S.A.S, Montigny-le-Bretonneux (FR)

(72) Inventor: Yoann Hebrard, Sarras (FR)

(73) Assignee: Aktiebolaget SKF, Gothenburg (SE)

( * ) Notice: Subject to any disclaimer, the term of this patent is extended or adjusted under 35 U.S.C. 154(b) by 253 days.

(21) Appl. No.: 16/020,253

(22) Filed: Jun. 27, 2018

(65) Prior Publication Data

US 2019/0025157 A1  Jan. 24, 2019

(30) Foreign Application Priority Data

Jul. 18, 2017 (DE) .......................... 102017212283.8

(51) Int. Cl.
| | |
|---|---|
| *G01M 13/045* | (2019.01) |
| *G01M 13/028* | (2019.01) |
| *G01M 13/04* | (2019.01) |
| *F16C 17/24* | (2006.01) |
| *F16C 19/52* | (2006.01) |
| *G01M 13/021* | (2019.01) |
| *F16C 41/00* | (2006.01) |

(52) U.S. Cl.
CPC .......... *G01M 13/045* (2013.01); *F16C 17/24* (2013.01); *F16C 19/52* (2013.01); *G01M 13/021* (2013.01); *G01M 13/028* (2013.01); *G01M 13/04* (2013.01); *F16C 41/008* (2013.01); *F16C 2233/00* (2013.01)

(58) Field of Classification Search
CPC .. G01M 13/045; G01M 13/04; G01M 13/021; G01M 13/028; F16C 17/24; F16C 17/246; F16C 19/52; F16C 41/008; F16C 2233/00

USPC .................................. 73/593, 587, 659, 660
See application file for complete search history.

(56) References Cited

U.S. PATENT DOCUMENTS

| | | | | |
|---|---|---|---|---|
| 4,927,299 A | * | 5/1990 | Ramalingam | B23B 27/164 407/120 |
| 5,191,796 A | * | 3/1993 | Kishi | B06B 1/06 310/336 |

(Continued)

FOREIGN PATENT DOCUMENTS

| | | |
|---|---|---|
| CN | 1738725 A | 2/2006 |
| CN | 101675343 A | 3/2010 |

(Continued)

OTHER PUBLICATIONS

Giap Ha and Jack M Hale, "Sensitivity of piezoelectric sensors fabricated with various types of commercial PZT powder" (2012) Institute of Mechanical Engineers Journal of Systems and Control Engineering, vol. 227(3), pp. 363-366 (Year: 2012).*

(Continued)

*Primary Examiner* — Lisa M Caputo
*Assistant Examiner* — Rose M Miller
(74) *Attorney, Agent, or Firm* — Garcia-Zamor Intellectual Property Law; Ruy Garcia-Zamor; Bryan Peckjian

(57) ABSTRACT

A mechanically functional component having at least one sensor arranged to convert one or more physical magnitudes to electrical sensor signals. The sensor includes an electroactive composite deposited directly onto the mechanically functional component and at least one conductive electrode deposited directly on a part of the electroactive composite.

17 Claims, 8 Drawing Sheets

(56) References Cited

U.S. PATENT DOCUMENTS

| | | | |
|---|---|---|---|
| 5,325,012 A * | 6/1994 | Sato | H01L 41/313 228/121 |
| 6,878,416 B2 | 4/2005 | Hall | |
| 9,423,836 B2 | 8/2016 | Seo | |
| 2014/0216159 A1* | 8/2014 | Gattermann | G01M 13/045 73/593 |
| 2015/0339001 A1 | 11/2015 | Zirkl | |

FOREIGN PATENT DOCUMENTS

| CN | 102458839 A | 5/2012 |
|---|---|---|
| CN | 105136456 A | 12/2015 |
| CN | 105405962 A | 3/2016 |
| CN | 105972088 A | 9/2016 |
| CN | 106769039 A | 5/2017 |
| EP | 2608287 A1 | 6/2013 |
| WO | 2015/091724 A2 | 6/2015 |

OTHER PUBLICATIONS

J.R. White, B. De Poumeyrol, J.M. Hale, and R. Stephenson, "Piezoelectric paint: Ceramic-polymer composites for vibration sensors", Journal of Materials Science (2004) vol. 39, pp. 3105-3114 (Year: 2004).*

Caspal, Jean-Fabien and David, Charlotte and Dantras, Eric and Lacabanne, Colette, Piezoelectric sensing coating for real time impact detection and location on aircraft structures (2012) Smart Materials and Structures, vol. 21 (No. 5), pp. 1-7 (Year: 2012).*

Elsevier / Sensitivity analysis of piezoelectric paint sensors made up of PZT ceramic powder and water-based acrylic polymer.

ResearchGate / K J Kirk, J Elgoyhen, J P Hood, D Hutson, R S Dwyer-Joyce, J Zhang and B W Drinkwater / Ultrasonic condition monitoring using thin-film piezoelectric sensors / Nov. 16, 2009.

* cited by examiner

SENSORIZED MECHANICAL COMPONENT

CROSS-REFERENCE

This application claims priority to German patent application no. 102017212283.8 filed on Jul. 18, 2017, the contents of which are fully incorporated herein by reference.

TECHNOLOGICAL FIELD

The invention concerns equipping mechanical components with one or more sensors and is more particularly directed to equipping mechanically functional components, such a parts of rolling element bearings, with one or more sensors and optionally their interface.

BACKGROUND

The invention is applicable to mechanical components such as shafts, gears, plain bearings and rolling element bearings. A rolling element bearing comprises an inner ring, an outer ring and several rolling elements or bodies installed between these two rings. These rolling elements can be balls, rollers or needles, which are traditionally held in place by a cage. A rolling element bearing can be, for instance, a ball bearing, a roller bearing or a needle bearing.

For condition monitoring in the fields of rolling element bearings and other mechanically functional components, it is known to attach one or more sensors to the mechanical component to thereby measure one or more physical parameters and transduce these physical parameters into electrical signals. For condition monitoring both force and vibration are of interest. Strain sensors are traditionally used for measurement of force and after further signal processing also possibly load. Accelerometers are traditionally used for measurement of vibration. There is still room for improvements.

SUMMARY

An object of the invention is to define a transducer/sensor that is firmly integrated to a structure, a mechanically functional component.

The aforementioned object is achieved according to the invention by an assembly, a sensorized assembly, comprising at least one sensor arranged to convert one or more physical magnitudes to electrical sensor signals. The assembly further comprises at least one mechanically functional component. The at least one mechanically functional component has one or more first surface areas related to the function of the at least one mechanically functional component and in addition one or more second surface areas. According to the invention the at least one sensor comprises at least two layers. A first layer with an electroactive composite deposited directly onto a whole of or a part of at least one of the one or more second surface areas. A second layer with at least one conductive electrode deposited directly on a part of the electroactive composite.

Suitably the electroactive composite is subjected to electrical poling during manufacture of the at least one sensor. Preferably the electroactive composite is a mix of a liquid matrix and submicro or nano particles. The liquid matrix is in some embodiments a polyurethane with high dielectric properties. The submicro or nano particles are suitably ferroelectric particles, preferably barium titanate particles. The conductive electrode can suitably be a piezoresistive composite, which is preferably a polymer matrix comprising conductive particles. In some embodiments at least one conductive electrode is designed as a multislot resonating patch antenna.

Depending on the application and the component that is to be monitored as to one or more physical magnitudes the mechanically functional component can for example be either a shaft, a gear, or a bearing. If it is a bearing then the mechanically functional component can be a part of a plain bearing or a part of rolling element bearing. If it is a part of a plain bearing, then the part can either be an outer ring or an inner ring. If it is a part of a rolling element bearing, then the part can be either an outer ring, an inner ring, or a cage.

The different additional enhancements/features/alternatives of the assembly according to the invention as described above can be combined in any desired manner as long as no conflicting enhancements/features/alternatives are combined.

A primary purpose of the invention is to provide a means to be able to integrate or rather create a sensor/transducer directly onto a mechanically functional component. This is obtained according to the invention by depositing/printing an electroactive composite directly onto the mechanically functional component and by depositing/printing at least one conductive electrode directly on a part of the electroactive composite, to thereby create a sensor/transducer integrated/being a part of a mechanically functional component.

There are economical and many technical advantages of the solution. A transducer for strain or vibration measurement can be firmly integrated to a structure, a mechanically functional component. This capability of the solution solves the integration issue and allows to add transducing material where the physical phenomena takes place. This improves the signal to noise ratio of the measurement, allowing a higher sensitivity as opposed to classical approaches like gluing or welding sensors to a component.

Since poling is key to piezoelectric material, electrode design with poling direction can be used to obtain an improvement of sensor characteristics or to create a specific sensor characteristic. As an example to illustrate this point, imagine a single piezoelectric layer with the shape of a ring is applied to a lateral face of a rolling element bearing. An additional layer of a conductive material can create a vibration sensor or a strain sensor in combination with the piezoelectric layer. Poling can be applied perpendicular to or in a tangent (parallel) to the electrode surface in order to have a piezoelectric coefficient in the axial or radial bearing direction.

For a load sensor configuration, electrodes are suitably located in a spatial arrangement in relation to size of the bearing and the rolling element spacing. When a loaded rolling element is in front of one electrode, the consecutive one is between two rolling elements. The electrode below the loaded rolling element is submitted to traction (generating positive charge displacement) whereas the consecutive one is submitted to compression (generating negative charge displacement). In order to measure strain, difference is done by a conditioning module, thus effects are summed. Other electrode design possibility is to have edge wave patterns which are of a periodicity that does not support undesired vibrational modes. The electrode design here offers spatial filtering.

Electrodes can also be functionalized as antenna structures. Electrodes can be designed here as delay lines with a resonator patterns. Coding is obtained by using delay and resonances of patterns. The electrodes are made of a number of radar cross section backscatterers or resonators that emit a distinct frequency signature when illuminated by an ultrawide band (UWB) signal. The resonant frequencies depend on equivalent circuit parameters of the individual scatterer. In addition, the variation of a particular scatterer's structural parameters does not affect the other resonant frequencies. By tuning the resonant properties of the sensing scatterers individually using for example smart polymer materials, a single chipless RFID tag with physical parameter sensing capabilities attained. Sensing information are coded in both magnitude and phase spectrum.

Matrix selection is key since this material provide encapsulation of particle and thus protection to environment, with adhesion to steel and mechanical resistance to external stress and thermal expansion.

The ability to create any desired sensor pattern provides the advantage to optimize the coupling between the transducer and the component structure to be sensed. The low thickness of the composite layer results in a very small cross-sectional area. Thus very small longitudinal forces create very large stresses within the material increasing sensitivity in magnitude higher than classical sensor like strain gauges for example. The low mass and thin printed profile of the composite avoid the use of additional integration work associated to classical instrumentation like gluing or manufacturing a groove to integrate a sensor to the structure. A large area can also be covered by the composite layer providing larger scale of measurement in comparison to classical directional sensor like accelerometer or strain gauges.

The sensor pattern can be designed and applied in a component location where mechanical energy transfer to the sensor transducer is the most efficient. For example, the piezoelectric composite can be designed as a portion of a circle applied to a bearing ring with its size and location matching the loaded area, to thereby maximize vibrational energy transfer from the rolling contact to the transducer.

Attachment of the smart composite to a structural surface is ideal since the piezoelectric composite layer is applied with printing and experiences the same strain as the structure which is not the case with conventional instrumentation for which strain transfer to the transducer is done through a solder, weld, or glue layer. This also avoids a soldering, welding, or gluing stage in the instrumentation process. Temperature and strain can be extracted from a piezoelectric composite.

Other advantages of this invention will become apparent from t h e detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 4. A rolling element bearing is used in the following examples to illustrate the invention and its implementation onto a mechanical component. The invention can be applied to any mechanically functional component, such as a shaft or gear, that has a suitable surface that is not in direct use.

Figure 1:
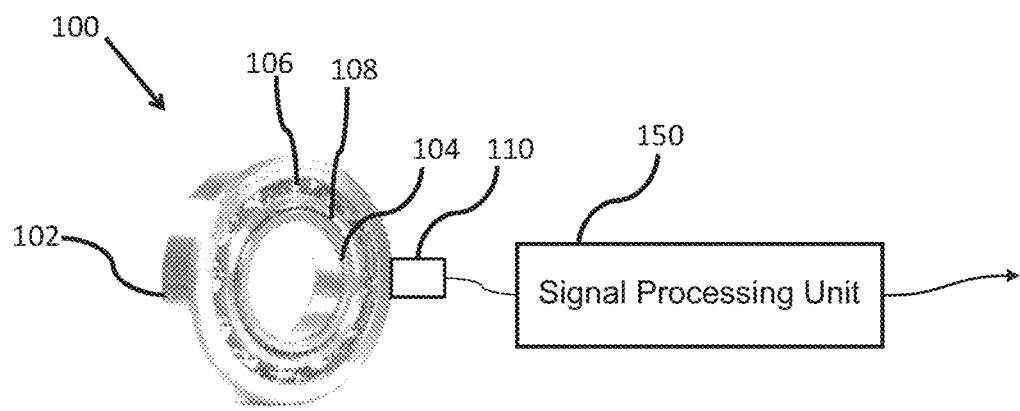
FIG. 1 illustrates an instrumented rolling element bearing.

FIG. 1 illustrates a traditional instrumented rolling element bearing 100 with an outer ring 102, rolling elements 106, a cage 108, an inner ring 104 and a sensor arrangement comprising at least one sensor unit 110 that will deliver its output to a first signal processing unit 150 that will deliver its output to some further signal processing or a monitoring unit. The transducer of the sensor unit 110, such as a piezoelectric strain sensor, could be mounted directly on a bearing surface by for example gluing. Alternatively the piezoelectric strain sensor could be mounted on a carrier, which would then in turn be attached to a suitable bearing surface by for example gluing, welding or some sort of mechanical attachment. This would then have to be repeated for every additional sensor unit, as most of the time there is a desire to have multiple sensor units.

The invention is a smart integrated sensing system which use a combination of smart materials also called nano- or micro-structured functional materials and any suitable printing device (such as inkjet, aerosol jet printing, screen printing, or additive manufacturing) to dispense it on a part of a mechanically functional component which acts as a substrate to receive a pervasive sensing function. Sensing material is thus directly applied to the mechanically functional component. The mechanically functional component can be a component of a bearing, such as an outer ring, an inner ring or a cage, or a gear, or for example a shaft.

In dependence of the used printing device (2D or 3D), the micro-structured material is formulated in the shape of an ink or a plastic filament to be fused during additive manufacturing.

For printing, the smart material is initially formulated as an electroactive composite which is a mix of a liquid matrix and submicro or nano particles. The liquid matrix is a polyurethane with high dielectric properties and with strong adhesion properties to the intended substrates. Suitably also with good compliance to environmental constraints. The submicro or nano particles are metal oxides (such as tiBaO3), carbon nanotubes etc. The matrix is selected according to printability criteria, adhesion to the substrate type (steels, composite materials, elastomer) and targeted electroactive properties once mixed with the particles and applied to the substrate. For a direct coupling and as well as of the specifications imposed on this composite, one solution proposed is the preparation of a composite based on barium titanate particles dispersed in a thermoplastic poly (urethane) matrix. Barium titanate is a high d33 piezoelectric ceramic which is found industrially for a low price. The temperature resistance and the piezoelectric activity of this material make it a candidate of choice. The thermoplastic polyurethane matrix is a polymer with a low mechanical modulus and which retains elastic character for large deformations. It should be noted that the grade of the polyurethane matrix can be adapted to be a material with less elongation at break but greater mechanical rigidity. In addition, this polymer has a high dielectric permittivity for a polymer (e/eO=7). The melting temperature of the polyurethane matrix is greater than 130° C. It is important to note that this matrix is easy to implement in different ways. It may also be dissolved in solvents or else be carried out by extrusion. Its low cost mechanical and thermal properties of this matrix make this material the ideal candidate for phase testing the composite and validating the piezoelectric effect in the intended application.

Electroactive properties depend not only on the individual components used but also on the morphology and the interfacial characteristics between them and the substrate. Several type of electro-active behavior can be obtained like electrical conductivity, dielectric properties and transducing characteristics for sensor application like piezo-resistive or piezo-electric properties. The mix ratio between the matrix and the particles, and characteristics of the substrate influences the final transducing performance and properties of the electro-active composite once applied to the substrate by the printing system.

By controlling the printing process and the substrate characteristics enables control of the final structure of the electro-active composite in term of mechanical resistance, transducing characteristics including a control of sensitivity of undesirable influences. Additional operations during the printing process may be necessary like sintering or electrical poling to obtain the final structure of the composite and thus its final transducing performance. Piezoelectric transducing properties can also be obtained on a coating with dielectric properties by applying electrical poling to the coating, the electroactive composite. The piezoelectric coefficient is also identified during the poling stage. The composite is thus calibrated. No additional calibration step is needed.

The piezoelectric composite is a layer that modifies its shape in response to electric stimuli. This material permits induced strain actuation and strain sensing which are the applications needed for condition monitoring and load sensing. On the one hand, induced strain actuation is a solid-state actuation which has fewer parts and is more reliable than classical actuation like shaker. This allows to integrate a sensor actuator system directly on the structure to perform structural health monitoring based on modal analysis technics or elastic wave analysis. On the other hand, strain sensing is direct without the need of an intermediate gauge bridge as with classical strain gauges. The obtained signal is direct and especially significant in dynamics and vibration. The frequency response of the piezoelectric material is superior to strain gauge and operation down to fraction of Hertz can be achieved by either conventional charge amplifiers or, since signal level are relatively high, simple high impedance PET buffer circuits.

The deposit of a piezoelectric composite directly to the structure by printing is different from gluing piezoelectric material to the structure because the composite is firmly coupled with the structure through the matrix adhesion properties, whereas conventional transducers materials are coupled through glue and sometimes necessitate specific location and addition of a groove to the component. The composite is further a non-resonant device that can be tuned selectively into several guided-wave modes, whereas conventional transducers are single-resonance devices. The thin, lightweight, and inexpensive composite can be deployed in large quantities on large surfaces, which is not the case for other transducers technologies (like accelerometers) which are commonly bulky and expensive.

Due to the piezoelectric character of this composite it is possible to use the composite as both transmitters and receivers of guided (lamb) waves in a thin wall structure. The lamb waves generated by a piezoelectric composite transmitter travel through the structure and are reflected or diffracted by structural boundaries, discontinuities and damage. The reflected or diffracted waves arrive at a piezoelectric composite receiver where they are transformed into electric signals.

Printed piezoelectric composite according to the invention can form the basis for many different high-bandwidth functions such as stress and strain sensors, wave exciters/transmitters and receivers, and resonators. High-bandwidth stress and strain sensors can be used for vibration and load measurements, passive sensing of damage-generating events through detection of low velocity impacts, such as indentation after shock for rolling bearing. High-bandwidth wave exciters/transmitters and receivers can be used for active sensing using pulse-echo, pitch catch and phased array methods. Resonators can create resonant mechanical vibration.

Figure 2A:
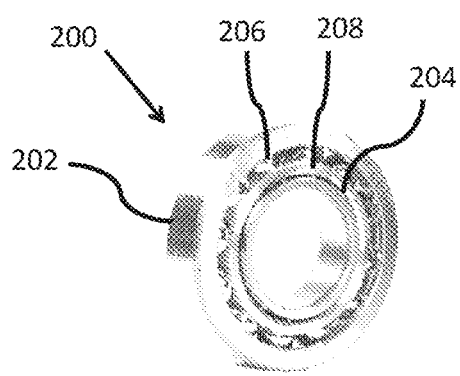
FIG. 2A-2C illustrates the buildup of an instrumented functional mechanical component according to the invention.
Figure 2B:
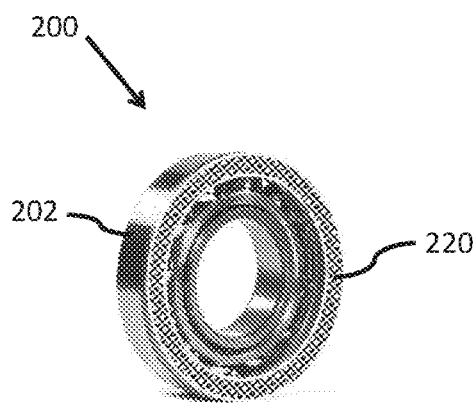
Figure 2C:
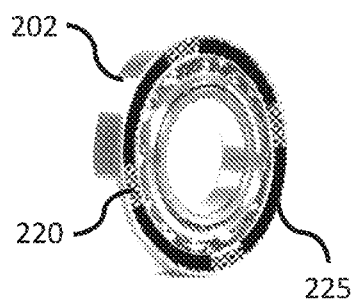

FIGS. 2A-2C illustrate the buildup of an instrumented mechanically functional component according to the invention. Illustrated is a rolling element bearing 200, similar to the one illustrated in FIG. 1. According to FIG. 2A it comprises an outer ring 202, an inner ring 204, rolling elements 206, and a cage 208 for the rolling elements 206. The mechanically functional component can for a rolling element bearing 200 be one or more of the outer ring 202, the inner ring 204, or the cage 208. In this example the outer ring 202 is chosen. FIG. 2B illustrates how a layer of electroactive composite 220 has been deposited on a side face surface of the outer ring 202 of the rolling element bearing 200. As described above, the surface onto which the electroactive composite is printed, might be treated/processed/machined to thereby get the desired characteristics, but also to get the desired adhesion of the electroactive composite onto the mechanically functional component. It can be especially necessary if the component is non-metallic, such as plastic, that the surface needs to be roughened to achieve the desired adhesion of the electroactive composite. FIG. 2C illustrates how a layer of conductive electrodes 225 has been deposited onto the layer of electroactive composite 220. The electrode layer is suitably made with a piezoresistive composite. A piezoresistive composite is made by mixing conductive particles in a polymer matrix. The conductive particles can for example be metallic powders for example silver powder, submicron wires, carbon black, carbon fibers, nanofibers or carbon nanotubes. If needed, poling is then performed by applying a strong electric field across the electroactive composite to thereby align the dipoles therein. In most applications electrical connections can be made to the substrate, in this case the outer ring 202, and the electrode(s) 225 and applying a high voltage there between.

Figure 3A:
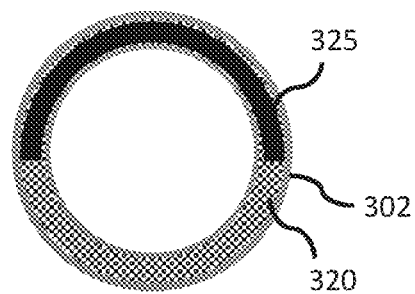
FIG. 3A-3B illustrate further embodiments of a smart ring according to the invention of for example an instrumented bearing.
Figure 3B:
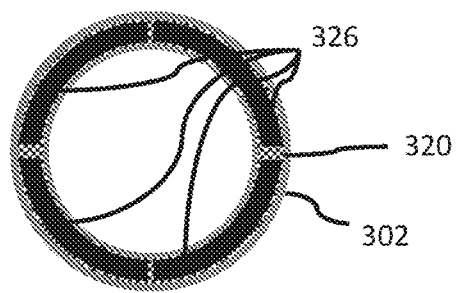

FIGS. 3A-3B illustrate further embodiments of a smart ring 302 according to the invention of for example an instrumented bearing. In these examples, the smart ring can, for example, be an outer ring of an instrumented bearing.

FIG. 3A illustrates an embodiment of a smart ring 302 according to the invention comprising a vibration sensor. A first layer of piezoelectric composite 320 is applied onto a surface of the smart ring 302. In this example the shape of this layer is a circle around the complete smart ring 302. The smart ring 302 may in some embodiments comprise areas of the surface comprising the piezoelectric layer 320, that are not covered with the piezoelectric layer 320. The piezoelectric layer 320 allows transduction of mechanical strains inside the bearing ring into charge displacement inside the piezoelectric layer.

An electrode layer 325 made of for example silver particle ink is then printed on the piezoelectric layer creating an electrode. Its shape is a half circle in this example. This electrode layer 325 allows to measure the charge displacement inside the piezoelectric layer 320 between the electrode and the substrate material of the smart ring 302. If the 2 points are connected to a voltage measurement device, a very small voltage change can be observed that is linked to a surface strain induced, for example, by a bearing vibration.

The quantity of charge captured depends of the electrode's surface. A half circle shape allows to capture all strain changes on the whole smart ring 302, making the whole smart ring a vibration sensor. Charge displacement between the electrode and the substrate is connected to a charge amplifier to get a voltage signal.

FIG. 3B illustrates an embodiment of a smart ring 302 according to the invention comprising a load sensor. A first layer of piezoelectric composite 320 is applied on a surface of a smart ring 302. The smart ring 302 can for example be the outer ring of a rolling element bearing. The shape of this layer is a circle around the smart ring. The piezoelectric composite layer 320 allows for transduction of mechanical strains inside the smart ring into charge displacement inside the piezoelectric layer.

Several electrodes 326 made of for example silver particle ink, are then printed on the piezoelectric layer 320, in different places around the smart ring. Their shapes are a portion of a circle. Each circular electrode section can for example be as large as the space between two consecutive rolling elements or a multiple thereof. When a loaded rolling element roll between two consecutive electrodes, the load generates strain on the bearing ring, and as a consequence, charge displacement between the two electrodes around this loaded rolling element. If a charge amplifier is then connected to these two electrodes, the signal is directly related to the load contact pulse of the rolling elements.

The quantity of charge captured depends of the electrode's surface. A portion of a circle shape allows to capture loaded rolling element strain pulses from the ring, making the whole design act as a strain sensor. Summing the strain level measured from each consecutive electrode gives access to the load applied on the bearing.

Electrodes can be made and placed in many different ways on top of a piezoelectric layer. One alternative is to cover a whole ring with a plurality of electrodes, each being a part of a circle. These plurality of electrodes could then be interconnected in different manners to provide one or more load, strain or vibration sensor(s), depending on where it is mounted/used, or switched dynamically in dependence on the desired type of sensor and place of sensor.

One or more electrodes can also be designed as antenna(s) for wireless transmission of a corresponding transducing layer signal. These electrodes can then be designed as an antenna structure to communicate its signal using the principle of chipless RFID. The piezoelectric composite layer, the sensor layer, is associated to an electrode printed as a multislot resonating patch antenna for signal coding. Chipless RFID use electromagnetic modulation done by a conductive line when hit by a radar wave. According to the conductive line shape, it emits a typical backscattered wave that can be analyzed using a vector network analyzer. Slots are designed inside the electrode structure to generate fixed resonance frequencies. Electrical coupling between the slotted electrodes and the piezoelectric transducer layer change the electrode resonance and its backscattered wave signature. This approach allows to send a signal with coding based on generating several resonances from the electrodes.

Figure 4:
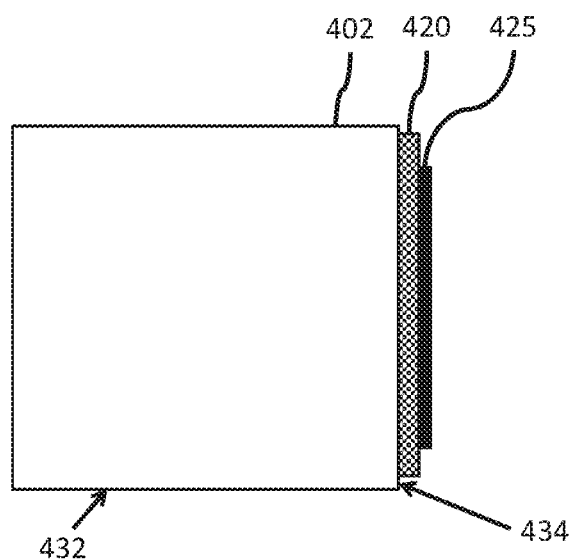
FIG. 4 illustrates a cross section of a smart ring according to the invention of for example an instrumented bearing.

FIG. 4 illustrates a cross section of a smart ring 402 according to the invention. It illustrates an outer ring as an example of a mechanically functional component thus creating an instrumented bearing. The mechanically functional component can as previously discussed, for example be a gear, a shaft or a component of a plain or rolling element bearing, such as an outer ring, an inner ring or a cage. What is required is that there is a free surface. In this example the outer ring 402 has a first surface 432 being used as an outer raceway, thus not the best surface onto which one could apply one or more strain sensors according to the invention. There could possibly be room next to the raceway, but the raceway would most likely take up most of the available surface area of this first surface 432, thus limiting the available surface area for a sensor. In this example the surface used for sensor(s) is a second surface 434. The second surface 434 is the outer ring 402 side surface, just like the examples of FIGS. 2C, 3A and 3B. To this second surface 434 a layer of an electroactive composite is deposited. It can cover the complete surface in question or a part of it. Thereafter a layer of conductive electrode(s) 425. Suitably the electrode layer is as wide/high on top of the electroactive layer as possible to thereby create sensors with as large a surface area as possible. The length of the electrodes will depend on many factors such as the type of sensors (vibration or strain), the type of application, the mechanically functional component, the desired number of sensors, and sensor spacing.

Figure 5:
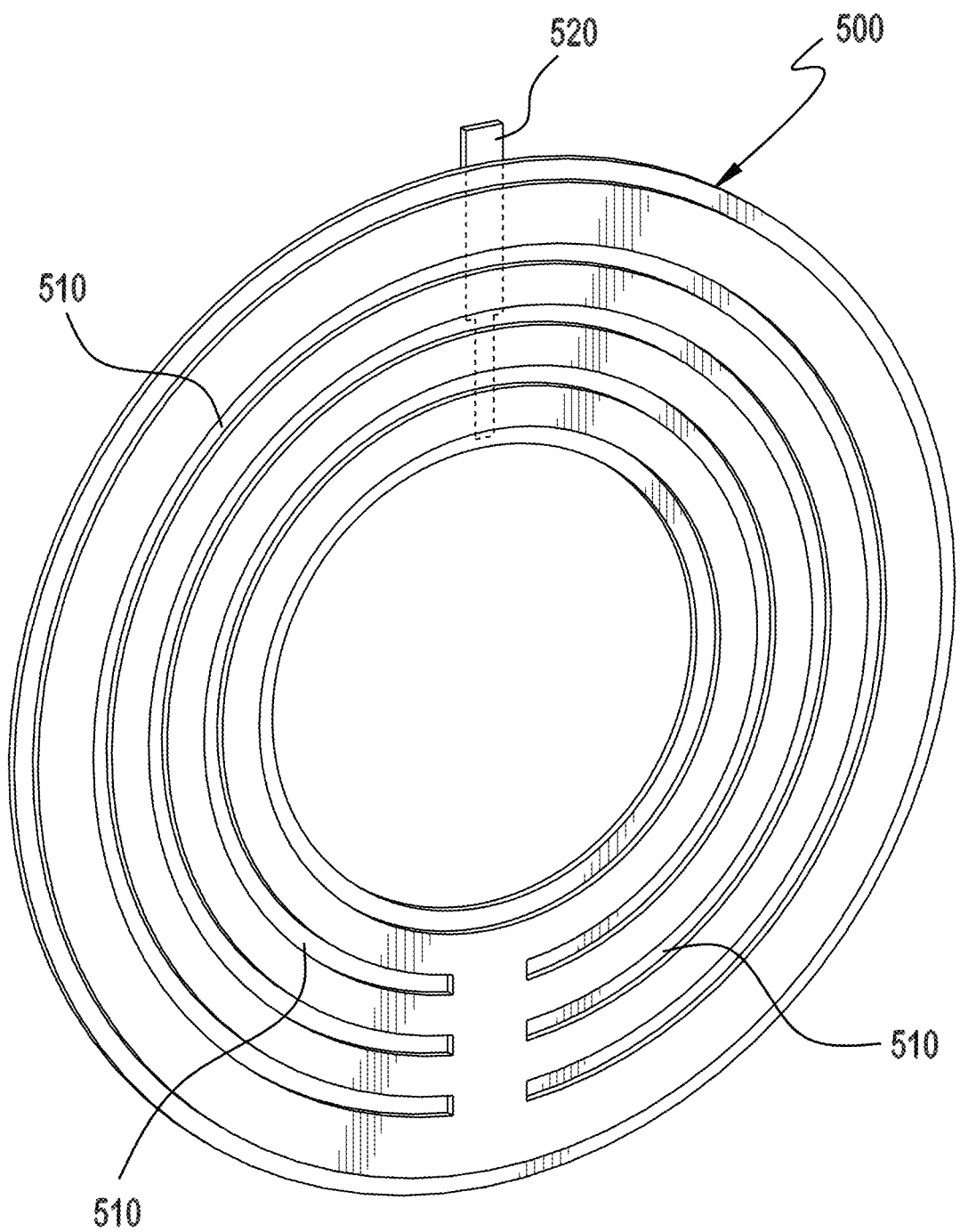
FIG. 5 illustrates an instrumented multiplot resonating patch antenna.

FIG. 5 illustrates a cross section of a multislot resonating patch antenna 500 according to the invention. The piezoelectric composite layer 510, the sensor layer, is associated to an electrode printed as a multislot resonating patch antenna for signal coding. The antenna 520 is shown.

Figure 6:
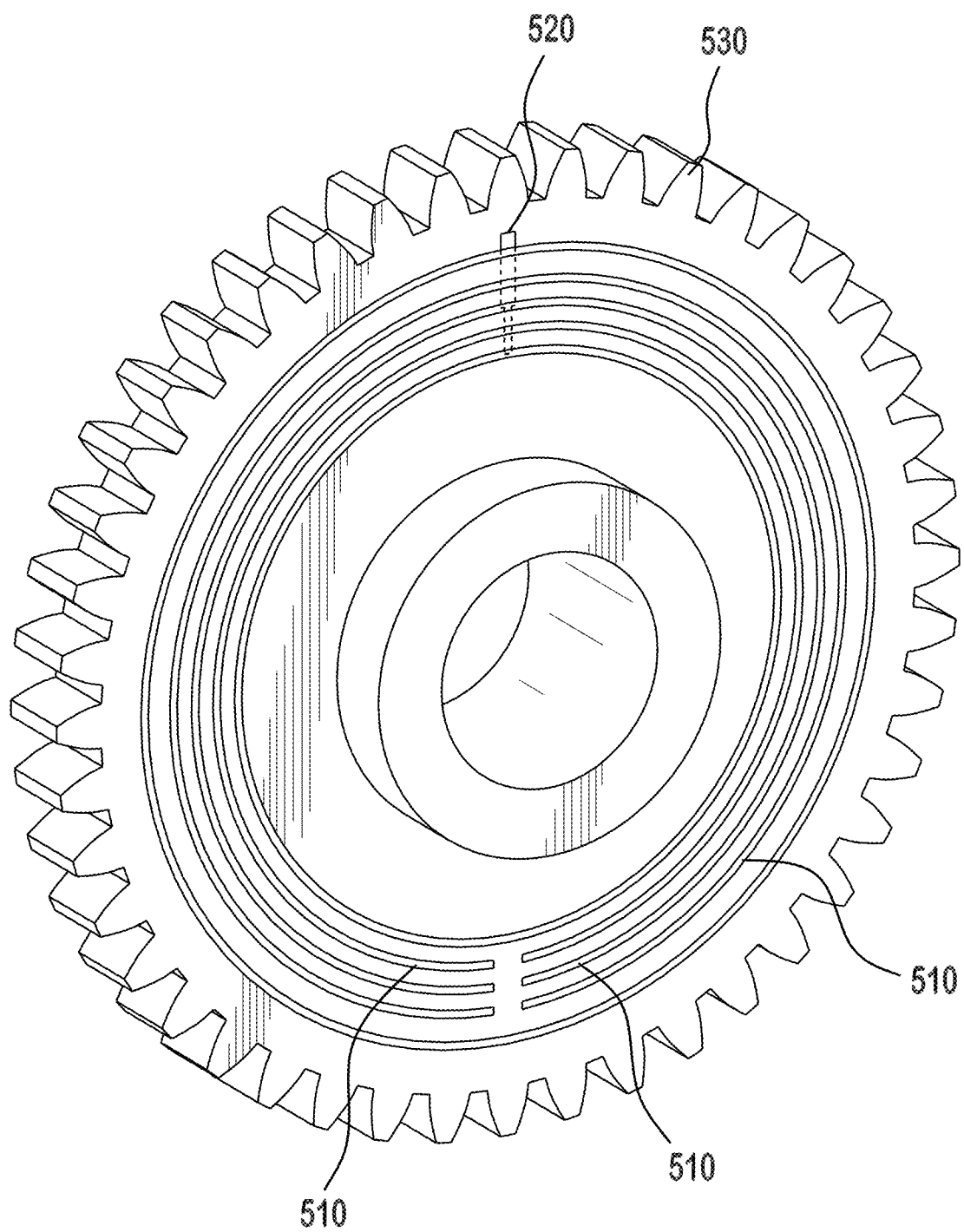
FIG. 6 illustrates an instrumented gear as the functional mechanical component according to the invention.

FIG. 6 illustrates a cross section of a gear 530 incorporating a a multislot resonating patch antenna according to the invention. Applied to the gear, at least one conductive electrode is designed as a multislot resonating patch antenna 500. The antenna is shown 520.

Figure 7:
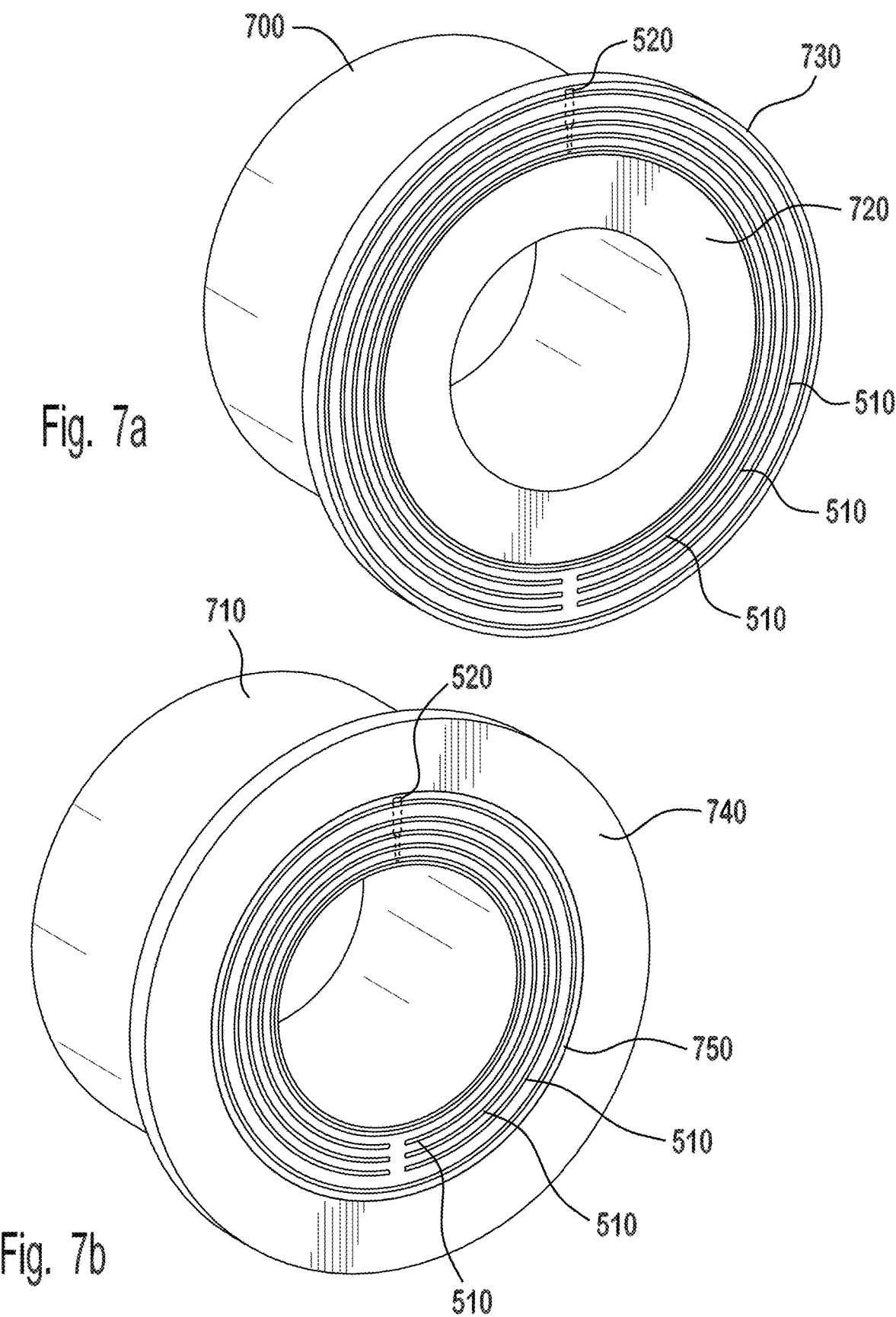
FIG. 7a illustrates an instrumented plain bearing wherein the instrumented functional component according to the invention is the outer ring.
FIG. 7b illustrates an instrumented plain bearing wherein the instrumented functional component according to the invention is the inner ring.

FIGS. 7a and 7b illustrate embodiments of plain element bearings incorporating a smart ring into one of the rings according to the invention. The mechanically functional component of the plain bearing can be either the inner ring or the outer ring. FIG. 7a shows a plain bearing according to the first embodiment 700 where the mechanically functional component is incorporated into the outer ring 730. The outer ring 730 has an electrode with layer of electroactive composite 510 whereas the inner ring 520, does not. FIG. 7b shows another embodiment of a plain bearing 710 according to the invention. In this embodiment the mechanically functional component is incorporated on the inner ring 750. The inner ring incorporates a multislot patch resonating antenna, with an an electrode layer of electroactive composite 510 and an antenna 520. The outer ring 740 does not possess the smart elements.

Figure 8:
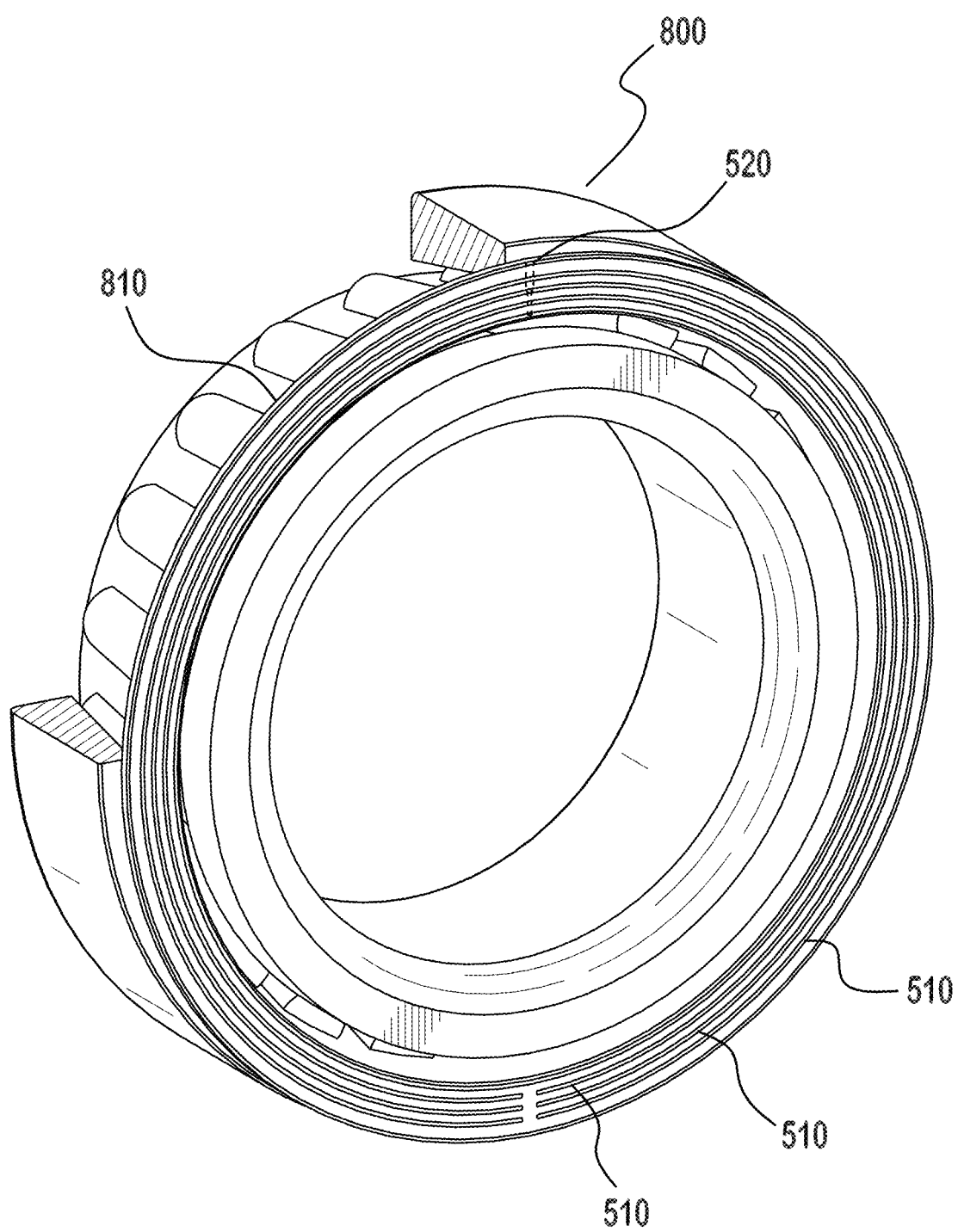
FIG. 8 illustrates an instrumented rolling element bearing wherein the instrumented functional component according to the invention is the cage.

FIG. 8 illustrates a rolling element bearing 800 incorporating a cage 810 as the mechanically functional component creating the instrumented bearing according to the invention. The cage 810 is mechanically functional because a layer of a multislot resonating patch antenna has been applied to the cage.

In general it is advantageous to use a surface of the mechanically functional component that has the largest available surface area for sensors. The larger the active sensor area is, the greater the output signal and signal to noise ratio will be. Care should be taken also for functionally free surfaces, just as this illustrated side surface, as it can be that such a surface even though it is not used functionally, is used during mounting for example. A bearing outer ring side surface is often used during mounting/dismounting of the bearing, which means that suitable there are a number of areas that are left without any sensors, possibly totally without both electroactive composite and conductive electrode, for use during mounting/dismounting. Alternatively, the electroactive composite layer and the conductive electrode layer are added once the bearing is mounted, that is in situ. The advantage with this is that the physical placement of the sensor(s) can be determined in relation to for example a shaft or housing.

The invention is based on the basic inventive idea of depositing sensors, strain sensors directly onto a mechanically functional component such as a shaft, gear or a part of a bearing. A typical implementation to a rolling element bearing is to print a smart integrated piezoelectric structure in the shape of a ring directly on one face of a bearing ring, such as the outer ring. The smart structure is made of a first piezoelectric ring directly applied to the bearing ring side surface. Conductive electrodes are printed directly on the piezoelectric ring with suitably a width as large as the ring height and a length equal to interval distance between two consecutive rolling elements. An encapsulating layer is suitably applied on the sensor structure and possibly with spared areas on the electrode locations to keep contact access for further signal processing/conditioning. This encapsulating layer is suitably a UV photopolymerised resin to provide mechanical and sealing protection to the transducer and electrodes composites. For shielding purposes before encapsulation, a dielectric composite is applied on the sensor layers possibly with spared location on the electrodes structure to allow electrical contact with a conditioning module and a layer of conductive composite is applied for shielding purposes on the whole ring possibly except spared areas for connection. The invention is not restricted to the above-described embodiments but may be varied within the scope of the following claims.

FIG. 1 illustrates an instrumented rolling element bearing:
100 Rolling element bearing,
102 Outer ring,
104 Inner ring,
106 Rolling elements,
108 Cage for rolling elements,
110 Sensor unit,
150 Signal processing for sensor unit.

FIGS. 2A-2C illustrate the buildup of an instrumented rolling element bearing according to the invention:
200 Rolling element bearing,
202 Outer ring,
204 Inner ring,
206 Rolling elements,
208 Cage for rolling elements,
220 Layer of electroactive composite,
225 Layer of conductive electrodes.

FIGS. 3A-3B illustrate further embodiments of a smart ring of an instrumented bearing according to the invention:
302 Ring of an instrumented rolling element bearing according to the invention,
320 Layer of electroactive composite,
325 Layer of conductive electrode in a first embodiment,
326 Layer of conductive electrodes in a second embodiment.

FIG. 4 illustrates a cross section of a smart ring of for example an instrumented bearing according to the invention:
402 A mechanically functional component, illustrated as an outer ring of an instrumented rolling element bearing according to the invention,
420 Layer of electroactive composite,
425 Layer of conductive electrode,
432 A functional surface of a mechanically functional component, here a raceway,
434 An unused surface of the mechanically functional component.

FIG. 5 illustrates a cross section of a multi-slot resonating patch antenna according to the invention:
500 Multislot resonating patch antenna
510 Electrode with layer of electroactive composite
520 Antenna FIG. 6 illustrates a cross section of a gear according to the invention:
510 Electrode with layer of electroactive composite,
520 Antenna,
530 Gear.

FIGS. 7A-7B illustrate further embodiments of a smart ring of an instrumented plain bearing according to the invention
700 First embodiment of a plain bearing,
710 Second embodiment of a plain bearing,
720 Inner ring of a first embodiment of a plain bearing,
730 Outer ring of a first embodiment of a plain bearing,
740 Outer ring of a second embodiment of a plain bearing,
750 Inner ring of a second embodiment of a plain bearing.
510 Layer of conductive electrode with electroactive composite.

FIG. 8 illustrates a further embodiment of a smart ring of an instrumented rolling element bearing according to the invention,[0094] 800 Rolling element bearing,
810 Cage,
510 Layer of conductive electrode with electroactive composite,
520 Antenna.

What is claimed is:

1. An assembly comprising:
at least one sensor arranged to convert one or more physical magnitudes to electrical sensor signals, and at least one mechanically functional component, the at least one mechanically functional component having one or more first surface areas related to the function of the at least one mechanically functional component and in addition one or more second surface areas, the at least one sensor is firmly coupled to the at least one mechanically functional component, where the at least one sensor comprises:
an electroactive composite deposited directly onto a whole of or a part of at least one of the one or more second surface areas in the form of a first layer;
at least one conductive electrode deposited directly on a part of the electroactive composite in the form of a second layer, the at least one conductive electrode is a piezoresistive composite, the at least one conductive electrode is configured as a multislot resonating patch antenna.

2. The assembly according to claim 1, where the electroactive composite is subjected to electrical poling during manufacture of the at least one sensor.

3. The assembly according to claim 1, wherein the mechanically functional component is one of a shaft, a gear, or a bearing.

4. The assembly according to claim 1, wherein the mechanically functional component is a part of a plain bearing.

5. The assembly according to claim 4, wherein the part of the plain bearing is an outer ring.

6. The assembly according to claim 4, wherein the part of the plain bearing is an inner ring.

7. The assembly according to claim 1, wherein the mechanically functional component is a part of rolling element bearing.

8. The assembly according to claim 7, wherein the part of the rolling element bearing is a cage.

9. An assembly comprising:
at least one sensor arranged to convert one or more physical magnitudes to electrical sensor signals, and at least one mechanically functional component, the at least one mechanically functional component having one or more first surface areas related to the function of the at least one mechanically functional component and in addition one or more second surface areas, the at least one sensor is firmly coupled to the at least one mechanically functional component, where the at least one sensor comprises:
an electroactive composite deposited directly onto a whole of or a part of at least one of the one or more second surface areas in the form of a first layer;
at least one conductive electrode deposited directly on a part of the electroactive composite in the form of a second layer;
wherein the conductive electrode is piezoresistive composite.

10. The assembly according to claim 9, wherein the piezoresistive composite is polymer matrix comprising conductive particles.

11. The assembly according to claim 9, wherein the mechanically functional component is one of a shaft, a gear, or a bearing.

12. The assembly according to claim 9, wherein the mechanically functional component is a part of a plain bearing.

13. The assembly according to claim 9, wherein the mechanically functional component is a part of rolling element bearing.

14. An assembly comprising:
at least one sensor arranged to convert one or more physical magnitudes to electrical sensor signals, and at least one mechanically functional component, the at least one mechanically functional component having one or more first surface areas related to the function of the at least one mechanically functional component and in addition one or more second surface areas, the at least one sensor is firmly coupled to the at least one mechanically functional component, where the at least one sensor comprises:
an electroactive composite deposited directly onto a whole of or a part of at least one of the one or more second surface areas in the form of a first layer;
at least one conductive electrode deposited directly on a part of the electroactive composite in the form of a second layer,
one of the at least one conductive electrode being provided and configures as a multislot resonating patch antenna.

15. The assembly according to claim 14, wherein the mechanically functional component is one of a shaft, a gear, or a bearing.

16. The assembly according to claim 14, wherein the mechanically functional component is a part of a plain bearing.

17. The assembly according to claim 14, wherein the mechanically functional component is a part of rolling element bearing.

* * * * *